United States Patent
Uradnisheck

(10) Patent No.: US 8,048,959 B2
(45) Date of Patent: Nov. 1, 2011

(54) ETHYLENE ALKYL ACRYLATE TOUGHENED POLY(HYDROXYALKANOIC ACID) COMPOSITIONS

(75) Inventor: Julius Uradnisheck, Glen Mills, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 372 days.

(21) Appl. No.: 12/423,523

(22) Filed: Apr. 14, 2009

(65) Prior Publication Data

US 2009/0209704 A1    Aug. 20, 2009

Related U.S. Application Data

(63) Continuation-in-part of application No. 11/516,949, filed on Sep. 7, 2006, now Pat. No. 7,595,363, which is a continuation-in-part of application No. 11/395,422, filed on Mar. 31, 2006, now Pat. No. 7,381,772, which is a continuation-in-part of application No. 10/996,899, filed on Nov. 23, 2004, now Pat. No. 7,354,973.

(60) Provisional application No. 60/529,208, filed on Dec. 12, 2003, provisional application No. 61/045,385, filed on Apr. 16, 2008.

(51) Int. Cl.
*C08K 5/07* (2006.01)

(52) U.S. Cl. ........ 525/162; 525/163; 525/166; 525/191; 525/176; 525/417; 525/419

(58) Field of Classification Search ................... 525/163, 525/162, 166, 191, 176, 417, 419
See application file for complete search history.

(56) References Cited

U.S. PATENT DOCUMENTS

| | | |
|---|---|---|
| 3,264,272 A | 8/1966 | Rees |
| 4,044,086 A | 8/1977 | McChesney |
| 4,187,358 A | 2/1980 | Kyo |
| 4,713,268 A | 12/1987 | Carson |
| 4,753,980 A | 6/1988 | Deyrup |
| 4,912,167 A | 3/1990 | Deyrup |
| 5,322,663 A | 6/1994 | Lai et al. |
| 5,443,780 A | 8/1995 | Matsumoto |
| 5,883,199 A | 3/1999 | McCarthy |
| 6,020,414 A | 2/2000 | Nelsen |
| 6,114,495 A | 9/2000 | Kolstad |
| 6,323,308 B1 | 11/2001 | Kobayashi |
| 6,417,298 B1 | 7/2002 | Ford |
| 6,713,175 B1 | 3/2004 | Terada |
| 6,756,331 B2 | 6/2004 | Kitahara |
| 6,943,214 B2 * | 9/2005 | Flexman ........................ 525/154 |
| 6,960,374 B1 | 11/2005 | Terada et al. |
| 6,986,864 B2 | 1/2006 | Porter |
| 7,078,368 B2 | 7/2006 | Laney |
| 7,175,917 B2 | 2/2007 | Sukigara |
| 7,354,973 B2 | 4/2008 | Flexman |
| 7,381,772 B2 | 6/2008 | Flexman |
| 2004/0242803 A1 | 12/2004 | Ohme |
| 2005/0131120 A1 | 6/2005 | Flexman |
| 2005/0151296 A1 | 7/2005 | Obuchi et al. |
| 2006/0009556 A1 | 1/2006 | Lu |
| 2006/0173133 A1 | 8/2006 | Flexman |
| 2007/0213466 A1 | 9/2007 | Uradnisheck |
| 2007/0255013 A1 | 11/2007 | Becraft |

FOREIGN PATENT DOCUMENTS

| | | |
|---|---|---|
| JP | 9316310 A1 | 12/1997 |
| WO | 03014224 A1 | 2/2003 |
| WO | 03082980 A1 | 10/2003 |
| WO | 2004101642 A1 | 11/2004 |
| WO | 2005059031 A1 | 6/2005 |
| WO | 2006017050 A1 | 2/2006 |
| WO | 2006084259 A1 | 8/2006 |
| WO | 2007127303 A1 | 11/2007 |
| WO | 2008/013699 A1 | 1/2008 |

* cited by examiner

*Primary Examiner* — Bernard Lipman

(57) ABSTRACT

Disclosed are poly(hydroxyalkanoic acid) compositions comprising a poly(hydroxyalkanoic acid) polymer, such as poly(lactic acid), and an impact modifier comprising a copolymer of ethylene and one or more alkyl acrylates of the formula $CH_2=C(R^1)CO_2R^2$, where $R^1$ is hydrogen or an alkyl group with 1-8 carbon atoms and $R^2$ is an alkyl group with 1-8 carbon atoms, such as methyl, ethyl, or butyl.

20 Claims, No Drawings

ETHYLENE ALKYL ACRYLATE TOUGHENED POLY(HYDROXYALKANOIC ACID) COMPOSITIONS

This application is a continuation-in-part of application Ser. No. 11/516,949, filed Sep. 7, 2006, now U.S. Pat. No. 7,595,363, which is a continuation-in-part of application Ser. No. 11/395,422, filed Mar. 31, 2006, now U.S. Pat. No. 7,381,772, which is a continuation in-part of application Ser. No. 10/996,899, filed Nov. 23, 2004, now U.S. Pat. No. 7,354,973, which claims priority to provisional application No. 60/529,208, filed Dec. 12, 2003. This application also claims priority to U.S. provisional application Ser. No. 61/045,385, filed Apr. 16, 2008, the entire disclosures of all priority applications are incorporated herein by reference.

The invention relates to thermoplastic poly(hydroxyalkanoic acid) compositions comprising impact modifiers derived from ethylene/alkyl acrylate copolymers.

BACKGROUND OF THE INVENTION

Poly(hydroxyalkanoic acids), also known as polyhydroxyalkanoates, have gained great attention in the plastics industry because they can be produced from renewable monomers. Because these polymers are biodegradable, they have been proposed for use in a broad range of applications. However, physical limitations such as brittleness and slow crystallization may limit the applications of poly(hydroxyalkanoic acids). Numerous impact modifiers have been developed in the past to improve the toughness of poly(hydroxyalkanoic acids). For example, US Patent Application No. 2006/0173133 discloses a toughened poly(hydroxyalkanoic acid) composition wherein an ethylene copolymer containing a comonomer with a glycidyl group (e.g., ethylene-butyl acrylate-glycidyl methacrylate (E/BA/GMA) terpolymer) is used as an impact modifier. However, due to safety concerns, the toughened poly(hydroxyalkanoic acid) compositions often need to undergo an additional wash step to remove the residual glycidal acrylates from the compositions. U.S. Patent Application Nos. 2006/0173133 and 2007/0255013 also disclose the addition of ethylene-alkyl acrylate dipolymers in poly(hydroxyalkanoic acid) compositions at 20 or at least 5 wt %. However, it has been found that the addition of the ethylene-alkyl acrylate dipolymer in such high levels often makes the poly(hydroxyalkanoic acid) too hazy to be useful.

Hence, it is desirable to develop an impact modifier that is free of residuals that might pose safety concerns so that the process for adding the impact modifier(s) is simplified and the resulting poly(hydroxyalkanoic acid) composition can be used as packaging materials directly. It is also desirable to develop an impact modifier that can be introduced into the poly(hydroxyalkanoic acid) composition at a level that maintains its clarity to an acceptable degree.

SUMMARY OF THE INVENTION

The invention provides a composition comprising, or produced from, a poly(hydroxyalkanoic acid) and an ethylene-alkyl acrylate copolymer, wherein (a) the ethylene-alkyl acrylate copolymer is present in the composition from about 0.1 to less than about 5 wt %, based on the total weight of the composition, (b) the ethylene-alkyl acrylate copolymer comprises about 50 to about 95 wt % polymerized units of ethylene and 5 to about 50 wt % polymerized units of one or more alkyl acrylates of the formula $CH_2\!=\!C(R^1)CO_2R^2$, based on the total weight of the copolymer, (c) $R^1$ is hydrogen or an alkyl group with 1 to 8 carbon atoms and $R^2$ is an alkyl group with 1 to 8 carbon atoms, and (d) the ethylene-alkyl acrylate copolymer is substantially free of comonomers having glycidyl groups.

The invention further provides an article comprising or produced from the above described composition, wherein the article is a molded article, an extruded article, a thermoformed article, an oriented article or a combination of two or more thereof.

DETAILED DESCRIPTION OF THE INVENTION

All references disclosed herein are incorporated by reference.

The invention provides a thermoplastic composition comprising a poly(hydroxyalkanoic acid) polymer and an impact modifier comprising an ethylene-alkyl acrylate copolymer that is substantially free of, or essentially free of comonomers having glycidyl groups.

As used here, the term "copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

The poly(hydroxyalkanoic acids) or poly(hydroxyalkanoic acid) polymers used here can be prepared by polymerization of hydroxyalkanoic acids having 2 to 7 carbon atoms. For example, the poly(hydroxyalkanoic acids) may be prepared by polymerization of 6-hydroxyhexanoic acid (also known as polycaprolactone (PCL)), 3-hydroxyhexanoic acid, 4-hydroxyhexanoic acid, or 3-hydroxyheptanoic acid. The poly(hydroxyalkanoic acids) are preferably derived from the polymerization of hydroxyalkanoic acids (or esters thereof) having 2 to 5 carbon atoms, such as, glycolic acid, lactic acid, 3-hydroxypropionic acid, 2-hydroxybutyric acid, 3-hydroxybutyric acid, 4-hydroxybutyric acid, 3-hydroxyvaleric acid, 4-hydroxyvaleric acid, or 5-hydroxyvaleric acid.

The poly(hydroxyalkanoic acids) may be homopolymers or copolymers comprising at least one comonomer derived from a hydroxyalkanoic acid or a derivative thereof. By derivative is meant a hydroxyalkanoate or a cyclic dimer (e.g., a lactide dimer) derived from the reaction between two hydroxyalkanoic acids. Blends of such polymers are also useful in the practice of the invention.

For example, the poly(hydroxyalkanoic acid) polymer may be a blend of copolymers of such as poly(hydroxybutyric acid-hydroxyvaleric acid) copolymers and poly(glycolic acid-lactic acid) copolymers. Such copolymers can be prepared by catalyzed copolymerization of a poly(hydroxyalkanoic acid) or derivative with one or more comonomers derived from cyclic esters and/or dimeric cyclic esters. Such esters may include glycolide (1,4-dioxane-2,5-dione); the dimeric cyclic ester of glycolic acid; lactide (3,6-dimethyl-1,4-dioxane-2,5-dione); α,α-dimethyl-β-propiolactone; the cyclic ester of 2,2 dimethyl-3-hydroxy-propanoic acid; β-butyrolactone; the cyclic ester of 3-hydroxybutyric acid; δ valerolactone; the cyclic ester of 5-hydroxypentanoic acid; ε-capro-lactone; the cyclic ester of 6-hydroxyhexanoic acid; the lactone of the methyl substituted derivatives of 6-hydroxyhexanoic acid (such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, and etc.); the cyclic ester of 12-hydroxy-dodecanoic acid and 2-p-dioxanone; and the cyclic ester of 2-(2 hydroxyethyl)-glycolic acid.

The poly(hydroxyalkanoic acid) polymers may also be copolymers of one or more hydroxyalkanoic acid monomers or derivatives with other comonomers, such as aliphatic and aromatic diacid and diol monomers (e.g., succinic acid, adipic acid, terephthalic acid, ethylene glycol, 1,3-propanediol, and 1,4 butanediol).

Preferably, the poly(hydroxyalkanoic acid) is selected from poly(glycolic acid), poly(lactic acid) (PLA), poly(hydroxybutyrate) and combinations of two or more of these polymers. More preferably, the poly(hydroxyalkanoic acid) is a poly(lactic acid) having a number average molecular weight (Mn) of about 3,000 to about 1,000,000. Preferably the Mn is about 10,000 to about 700,000, more preferably about 20,000 to about 600,000.

The poly(lactic acid) may be a homopolymer or a copolymer containing at least about 50 mol %, or at least about 70 mol %, of copolymerized units derived from lactic acid or derivatives thereof. The poly(lactic acid) homopolymers or copolymers can be prepared from the two optical monomers D-lactic acid and L-lactic acid, or a mixture thereof (including a racemic mixture thereof). The poly(lactic acid) copolymer may be a random copolymer or a block copolymer or a stereo block copolymer or a stereo complex between optical blocks. For example, the poly(lactic acid) copolymer may be the stereo complex of about 50% of poly(D-lactic acid) and about 50% of poly(L-lactic acid).

The poly(hydroxyalkanoic acid) may be prepared by any suitable process. For example, the poly(hydroxyalkanoic acid) may be prepared by a) a direct dehydration-polycondensation process which involves the dehydration and condensation of the hydroxyalkanoic acid(s) in the presence of an organic solvent and catalyst (see e.g., U.S. Pat. Nos. 5,310, 865 and 5,401,796); b) an indirect polymerization process which involves the dehydration of the hydroxyalkanoic acid(s) into cyclic dimers thereof and the ring-opening polymerization of the cyclic dimers (see e.g., U.S. Pat. No. 2,703, 316); or c) the reaction of two or more homopolymers of poly(hydroxyalkanoic acid) in the presence of an organic solvent (see e.g., European Patent Publication No. 712880A2).

Poly(hydroxyalkanoic acid) polymers may also be synthesized in vivo by living organisms or isolated from plant matter. Numerous microorganisms have the ability to accumulate intracellular reserves of poly(hydroxyalkanoic acid) polymers. For example, the copolymer of poly(3-hydroxybutyrate-co-3-hydroxyvalerate) (PHB/V) has been produced by fermentation by the bacterium *Ralstonia eutropha*. Fermentation and recovery processes for other types of poly(hydroxyalkanoic acid) polymers have also been developed using a range of bacteria including *Azotobacter, Alcaligenes latus, Comamonas testosterone* and genetically engineered *E. coli* and *Klebsiella*. U.S. Pat. No. 6,323,010 discloses a number of poly(hydroxyalkanoic acid) polymers prepared from genetically modified organisms.

The impact modifier used here comprises at least one ethylene-alkyl acrylate copolymer that is substantially free of, or essentially free of comonomers having glycidyl groups.

Ethylene copolymer refers to a polymer derived from (e.g. made of) ethylene and other additional comonomer(s). The ethylene-alkyl acrylate copolymer is derived from polymerizing monomers of (a) ethylene and (b) one or more olefins of the formula $CH_2=C(R^1)CO_2R^2$, where $R^1$ is hydrogen or an alkyl group with 1-8 carbon atoms and $R^2$ is an alkyl group with 1-8 carbon atoms, such as methyl, ethyl, or butyl. Monomers (b) can be methyl, ethyl, or butyl (meth)acrylates. One or more of n-butyl acrylate, tert-butyl acrylate, iso-butyl acrylate, and sec-butyl acrylate may be used. Repeat units derived from monomer (a) may comprise about 50 to about 95 wt %, about 60 to about 85 wt %, or about 70 to about 80 wt % of the total weight of the ethylene copolymer. Repeat units derived from monomer (b) may comprise 5 to about 50 wt %, about 15 to about 40 wt %, or about 20 to about 30 wt % of the total weight of the ethylene copolymer.

Specific examples of the ethylene copolymers include dipolymers produced by copolymerization of ethylene and methyl acrylate, which are referred to as E/MA, dipolymers produced by copolymerization of ethylene and ethyl acrylate, which are referred to as E/EA, and dipolymers produced by copolymerization of ethylene and butyl acrylate, which are referred to as E/BA.

Additional comonomers other than those containing glycidyl groups, such as carbon monoxide (CO) comonomers, may be included in addition to monomers (a) and (b) in producing the ethylene-alkyl acrylate copolymers. When present, repeat units derived from carbon monoxide may comprise up to about 20 wt % or about 3 to about 15 wt % of the total weight of the ethylene copolymer.

The ethylene-alkyl acrylate copolymers may be prepared by any suitable process. In particular, the ethylene-alkyl acrylate copolymers may be prepared by polymerization of the comonomers in the presence of a free-radical polymerization initiator at elevated temperatures (e.g., about 100° C. to about 270° C. or about 130° C. to about 230° C.) and elevated pressures (e.g., at least about 70 MPa or about 140 to about 350 MPa) and the polymerization may be carried out by a) a batch process in a conventional autoclave, or b) a continuous process in a series of autoclaves or a multi-zoned autoclave or a tubular reactor (see, e.g., U.S. Pat. Nos. 3,350,372; 3,756, 996; 5,532,066; 5,543,233; and 5,571,878).

The ethylene-alkyl acrylate copolymers may be homogeneous or not. For example, the ethylene-alkyl acrylate copolymers may not be homogeneous in terms of concentration of monomer units along the polymer chain due to imperfect mixing during polymerization or variable monomer concentrations during the course of the polymerization.

The invention provides a poly(hydroxyalkanoic) acid composition comprising at least one poly(hydroxyalkanoic acid) polymer, as described above, and at least one impact modifier derived from (or made of) an ethylene-alkyl acrylate copolymer, as described above. Preferably, the ethylene-alkyl acrylate impact modifier may be present at a level of about 0.1 to less than about 5 wt %, or about 1 to about 4 wt %, or about 2 to about 3 wt % in the composition.

The compositions may also optionally further comprise other additives in amounts depending on the particular use. For example, the following additive levels are generally useful: about 0.5 to about 7 wt % of plasticizer; about 0.1 to about 2 wt % of antioxidants and stabilizers; about 0.5 to about 30 wt % of fillers; about 5 to about 40 wt % of reinforcing agents; and/or about 1 to about 30 wt % of flame retardants, based on the total weight of the composition. Examples of suitable fillers include glass microspheres or carbon black and minerals such as talc, and wollastonite. However, to maintain the optical quality of the polyester compositions, it is preferred to include additives or fillers having a small particle size (e.g., below about 200 nanometers, or below 20 nanometers).

The poly(hydroxyalkanoic acid) compositions disclosed herein are developed based on the surprising discovery that, at a level below about 5 wt %, or preferably about 1 to about 4 wt %, or more preferably about 2 to about 3 wt %, the ethylene-alkyl acrylate copolymers can effectively toughen the poly (hydroxyalkanoic acids) while maintaining the haze and clarity level thereof at an acceptable degree (see the Examples section).

The poly(hydroxyalkanoic acid) compositions may be prepared by melt blending the poly(hydroxyalkanoic acid) and the ethylene-alkyl acrylate copolymer(s) components until they are substantially homogeneously dispersed to a degree such that particles of any component polymer are not easily observed visually and essentially no laminar morphology is formed when the composition is injection molded to form an article. If other additional additive materials are present they preferably also be substantially homogeneously dispersed in the blend of the poly(hydroxyalkanoic acid) and the ethylene-alkyl acrylate(s). Any melt-blending method known in the art may be used provided care is taken not to subject the composition to conditions that result in excessively high shear rates or localized long hold-up times because such conditions may result in generation of temperatures sufficient to decompose the poly(hydroxyalkanoic acid). For example, the composition may be prepared by 1) mixing all the component materials until homogeneous using a melt-mixer such as a single-screw extruder, twin-screw extruder that does not subject the composition to excessive shear, blender, kneader, Banbury mixer or roll mixer or 2) mixing a portion of the component materials in a melt-mixer followed by further addition and melt mixing of the remaining of the component materials until a homogeneous composition is obtained.

The invention further provides articles comprising or produced from the poly(hydroxyalkanoic acid) compositions. Such articles may be formed using one of a number of suitable melt-processing techniques, which include, but are not limited to, injection molding, cast extrusion, extrusion blow molding, injection stretch blow molding, calendaring and spinning.

The poly(hydroxyalkanoic acid) articles may be of any shape or size. They include, but are not limited to, injection molded articles, bags, tubes, cups, bottles, trays, bowls, films, sheets, and filaments.

The poly(hydroxyalkanoic acid) articles may be used in a broad range of applications. For example, they may be used as thermoformed packaging articles for food (e.g., clam-shells for protecting lettuces and sandwiches, cups for holding beverages, and trays for holding meats), injection molded jars for cosmetics, or stamped blister packages for medicine. The poly(hydroxyalkanoic acid) compositions may also be formed into non-structural and non-packaging articles for instrument housings or structural articles for ribbings. In addition, the films or sheets formed from the poly(hydroxyalkanoic acid) composition may be laminated with other materials by adhesive lamination or heat lamination to form multi-layer structures.

EXAMPLES

The following Examples and Comparative Examples are intended to be illustrative of the invention, and are not intended in any way to limit the scope of the invention.
Materials
PLA-1: NatureWorks® 2002D, a poly(lactic acid) polymer available from NatureWorks LLC, Minnetonka, Minn.
PLA-2: NatureWorks® 3001D, a poly(lactic acid) polymer available from NatureWorks LLC.
E/BA-1: Elvaloy® 3427 AC, an ethylene-butyl acrylate dipolymer containing 27 wt % polymerized units of butyl acrylate, available from E. I. du Pont de Nemours and Company, Wilmington, Del. (DuPont).
E/BA-2: Elvaloy® 3717 AC, an ethylene-butyl acrylate dipolymer containing 17 wt % polymerized units of butyl acrylate, available from DuPont.
E/MA: Elvaloy® 1224 AC, a copolymer of ethylene and methyl acrylate containing 24% methyl acrylate, available from DuPont.
E/BA/GMA: an ethylene-butyl acrylate-glycidyl methacrylate terpolymer containing 66.75 wt % polymerized units of ethylene, 28 wt % polymerized units of n-butyl acrylate, and 5.25 wt % polymerized units of glycidyl methacrylate. The resin has a Melt Index of 12 dg/min at 190° C. and a melting endotherm of about 25 J/g occurring over the range of 50° C. to 80° C.

Comparative Examples CE1-4 and Examples E1-12

The compositions of the sheets used in Examples 1-12 are listed in Table 1 and those used in Comparative Examples CE1-CE4 are listed in Table 1A. The sheets were prepared by melt compounding the component material in a 30 mm co-rotating Werner & Pfleiderer twin screw extruder. Specifically, pellets of poly(lactic acids) and the additives were dry blended and fed into the extruder together. The extruder screw was composed of forward conveying elements with a 5% length of kneading blocks part in the middle length. The condition was set with the screw speed being 100 RPM, the throughput 30 lb/hr (13.6 kg/hr), and the die melt temperature about 190° C. The melt exited through an 8 inch (20.3 cm) wide sheeting die with a die gap for 20 mil (0.5 mm) sheets. The melt curtain fell about 5 cm onto a quench drum set to about 22° C. The resulting sheets were amorphous PLA sheets containing various additives. Semi-crystalline sheets were obtained by maintaining the thus-formed amorphous sheets overnight at 107° C. in a nitrogen-blanketed oven.

To determine the tensile strength for the amorphous and semi-crystalline sheets in each sample, the percent elongation at break of the sheets (at both machine direction (MD) and transverse direction (TD)) was measured according to ASTM D-638 using an Instron Series IX instrument (Instron Corp, Norwood, Mass.). Specimens were in a Type IV shape with "w" at 0.18 in (0.46 cm), "L" at 0.5 in (1.27 cm), and "L0" at 1.5 in (0.38 cm) and the test speed was 2 in/min (5.1 cm/min). The results are tabulated in Table 1 and Table 1A.

The data indicate that the addition of the ethylene-alkyl acrylate copolymer (e.g., E/BA-1, E/BA-2, and E/MA) in poly(lactic acid) (e.g., PLA-1) improved the percent elongation at break thereof. The data further indicate that, when compared to the ethylene-butyl acrylate-glycidyl methacrylate terpolymer (i.e., E/BA/GMA), the ethylene-alkyl acrylate copolymer without glycidyl groups improved the tensile strength of the poly(lactic acid) at similar degrees. (See, e.g., E1-3, E5-7, E9-11, and CE2-4). The effect of the ethylene-alkyl acrylate copolymer on tensile strength was not linear from 1 to 10 wt %. In another word, a minimum amount of ethylene-alkyl acrylate copolymer (e.g., as low as 2 wt %) improved the tensile strength for the poly(lactic acid) composition significantly and such an effect reached a plateau at about 5 wt %.

TABLE 1

| Sample | E1 | E2 | E3 | E4 | E5 | E6 | E7 | E8 | E9 | E10 | E11 | E12 |
|---|---|---|---|---|---|---|---|---|---|---|---|---|
| PLA-1 (lb) | 5 | 5 | 5 | 5 | 5 | 5 | 5 | 5 | 5 | 5 | 5 | 5 |
| E/BA-1 | 0.05 | 0.1 | 0.26 | 0.55 | 0 | 0 | 0 | 0 | 0 | 0 | 0 | 0 |
| E/BA-2 | 0 | 0 | 0 | 0 | 0.05 | 0.1 | 0.26 | 0.55 | 0 | 0 | 0 | 0 |

TABLE 1-continued

| Sample | E1 | E2 | E3 | E4 | E5 | E6 | E7 | E8 | E9 | E10 | E11 | E12 |
|---|---|---|---|---|---|---|---|---|---|---|---|---|
| E/MA | 0 | 0 | 0 | 0 | 0 | 0 | 0 | 0 | 0.05 | 0.1 | 0.26 | 0.55 |
| E/BA/GMA | 0 | 0 | 0 | 0 | 0 | 0 | 0 | 0 | 0 | 0 | 0 | 0 |
| wt % Additive | 1 | 2 | 4.9 | 9.9 | 1 | 2 | 4.9 | 9.9 | 1 | 2 | 4.9 | 9.9 |
| Sample 1 | 203 | 193 | 246 | 218 | 9 | 206 | 258 | 158 | 208 | 258 | 42 | 219 |
| Sample 2 | 193 | 237 | 215 | 206 | 210 | 251 | 220 | 193 | 3 | 164 | 267 | 234 |
| Sample 3 | 237 | 203 | 240 | 209 | 143 | 70 | 249 | 199 | 3 | 205 | 237 | 219 |
| Average | 211 | 211 | 234 | 211 | 121 | 176 | 242 | 183 | 71 | 209 | 182 | 224 |
| Standard Deviation | 23 | 23 | 16 | 6 | 102 | 94 | 20 | 22 | 118 | 47 | 122 | 9 |
| Sample 1 | 13 | 239 | 208 | 267 | 94 | 232 | 47 | 251 | 15 | 22 | 200 | 259 |
| Sample 2 | 209 | 202 | 20 | 254 | 200 | 167 | 206 | 38 | 10 | 203 | 215 | 179 |
| Sample 3 | 143 | 205 | 198 | 253 | 231 | 5 | 214 | 58 | 12 | 89 | 6 | 260 |
| Average | 122 | 215 | 142 | 258 | 175 | 135 | 156 | 116 | 12 | 105 | 140 | 233 |
| Standard Deviation | 100 | 21 | 106 | 8 | 72 | 117 | 94 | 118 | 3 | 92 | 117 | 46 |
| Sample 1 | 38 | 44 | 87 | 38 | 20 | 12 | 34 | 29 | 7 | 9 | 64 | 72 |
| Sample 2 | 35 | 110 | 71 | 37 | 7 | 6 | 36 | 39 | 9 | 22 | 23 | 65 |
| Sample 3 | 24 | 27 | 43 | 32 | 9 | 12 | 43 | 39 | 14 | 18 | 45 | 59 |
| Average | 32 | 60 | 67 | 36 | 12 | 10 | 38 | 36 | 10 | 16 | 44 | 65 |
| Standard Deviation | 7 | 44 | 22 | 3 | 7 | 3 | 5 | 6 | 4 | 7 | 21 | 7 |
| Sample 1 | 28 | 36 | 42 | 69 | 9 | 11 | 105 | 27 | 15 | 7 | 34 | 81 |
| Sample 2 | 6 | 7 | 39 | 63 | 10 | 23 | 17 | 18 | 11 | 13 | 59 | 25 |
| Sample 3 | 13 | 9 | 38 | 47 | 6 | 16 | 27 | 58 | 10 | 12 | 17 | 48 |
| Average | 16 | 17 | 40 | 60 | 8 | 17 | 50 | 34 | 12 | 11 | 37 | 51 |
| Standard Deviation | 11 | 16 | 2 | 11 | 2 | 6 | 48 | 21 | 3 | 3 | 21 | 28 |

TABLE 1A

| Sample | CE1 | CE2 | CE3 | CE4 |
|---|---|---|---|---|
| PLA-1 (lb) | 5 | 5 | 5 | 5 |
| E/BA-1 | 0 | 0 | 0 | 0 |
| E/BA-2 | 0 | 0 | 0 | 0 |
| E/MA | 0 | 0 | 0 | 0 |
| E/BA/GMA | 0 | 0.05 | 0.1 | 0.26 |
| wt % Additive | 0 | 1 | 2 | 4.9 |
| Elongation at Break (%) Amorphous Sheet (TD) | | | | |
| Sample 1 | 68 | 3 | 3 | 110 |
| Sample 2 | 3 | 2 | 220 | 235 |
| Sample 3 | 2 | 206 | 5 | 83 |
| Average | 24 | 70 | 76 | 143 |
| Standard Deviation | 38 | 117 | 125 | 81 |
| Elongation at Break (%) Amorphous Sheet (MD) | | | | |
| Sample 1 | 39 | 12 | 24 | 220 |
| Sample 2 | 14 | 206 | 196 | 270 |
| Sample 3 | 6 | 115 | 66 | 260 |
| Average | 20 | 111 | 95 | 250 |
| Standard Deviation | 17 | 97 | 90 | 26 |
| Elongation at Break (%) Semi-crystalline Sheet (TD) | | | | |
| Sample 1 | 5 | 24 | 18 | 15 |
| Sample 2 | 3 | 14 | 30 | 31 |
| Sample 3 | 3 | 15 | 9 | 43 |
| Average | 4 | 18 | 19 | 30 |
| Standard Deviation | 1 | 6 | 11 | 14 |
| Elongation at Break (%) Semi-crystalline Sheet (MD) | | | | |
| Sample 1 | 3 | 7 | 33 | 20 |
| Sample 2 | 4 | 10 | 10 | 15 |
| Sample 3 | 3 | 23 | 10 | 13 |
| Average | 3 | 13 | 18 | 16 |
| Standard Deviation | 1 | 9 | 13 | 4 |

Comparative Example CE5 and Examples E13-16

The compositions used are listed in Table 2. Each of the materials for each sample was compounded in a twin-screw extruder with the barrels and die set to about 175° C. at 200 rpm and about 30 lb/hr (13.6 kg/hr). The resulting compositions in dry pellet form were molded into 0.125 in (3.17 mm) thick and 13.4 cm long test bars on a 1½ oz B injection molding machine from Arburg GmbH, Newington, Conn. at a melt temperature of 190° C., an injection time of 15 sec, a cooling time of 20 sec, an injection speed of 20 in/sec (51 cm/sec), and a circumferential screw speed of 50 ft/min (15.2 m/min). The as molded test bars were labeled as "amorphous", although they might not necessarily be 100% amorphous, while the test bars which were further kept at 107° C. for overnight were labeled as "semi-crystalline". The amorphous and semi-crystalline test bars were then subjected to an impact testing in accordance to ASTM method D-256 and their Notched Izod impact resistances are tabulated in Table 2.

The data indicate that the addition of the ethylene-alkyl acrylate (i.e., E/BA-1) improved the impact resistance of the poly(lactic acid) when it was in the semi-crystalline form. The data also indicate that such improvement on the impact resistance reached its maximum when the ethylene-alkyl acrylate additive was at around 5 wt %.

TABLE 2

| Sample No. | CE5 | E13 | E14 | E15 | E16 |
|---|---|---|---|---|---|
| PLA-2 (lb (kg)) | 10 (2.5) | 10 (2.5) | 10 (2.5) | 10 (2.5) | 10 (2.5) |
| E/BA-1 (lb (kg)) | 0 | 0.1 (0.05) | 0.3 (0.14) | 0.53 (0.24) | 2.5 (1.13) |
| % E/BA-1 | 0 | 1 | 2.9 | 5 | 20 |
| Notched Izod Amorphous Sample | | | | | |
| At Gate (ft-lb/in (J/m)) | 1.5 (80) | 1.4 (74.7) | 1.5 (80) | 1.4 (74.7) | 1.5 (80) |
| At Far End (ft-lb/in (J/m)) | 1.4 (74.7) | 1.3 (69.4) | 1.3 (69.4) | 1.5 (80) | 1.7 (90.8) |

TABLE 2-continued

| Sample No. | CE5 | E13 | E14 | E15 | E16 |
|---|---|---|---|---|---|
| Notched Izod Semi-crystalline Sample | | | | | |
| At Gate (ft-lb/in (J/m)) | 1.5 (80) | 2.6 (139) | 3.5 (187) | 4.2 (224) | 3.5 (187) |
| At Far End (ft-lb/in (J/m)) | 1.9 (101) | 3.8 (203) | 4.7 (251) | 5.1 (272) | 3.4 (182) |

Comparative Example CE6 and Examples E17-20

In these examples, compression molded sheets made of PLA-2 with various amounts of E/BA-1 additives were tested for Internal Haze in accordance to ASTM method D1003. The results (Table 3) demonstrate that E/BA-1 reduced clarity on PLA-2. The haze level was minimized to less than 90% by keeping the E/BA-1 level less than 5 wt %.

TABLE 3

| Sample No. | E/BA-1 (wt %) | Sheet Thickness (mil) | Internal Haze (%) |
|---|---|---|---|
| CE6 | 0 | 11 | 6 |
| E17 | 1 | 10 | 24 |
| E18 | 3 | 12 | 68 |
| E19 | 5.3 | 12 | 91 |
| E20 | 25 | 11 | 97 |

The invention claimed is:

1. A composition comprising, or produced from, a poly (hydroxyalkanoic acid) and an ethylene-alkyl acrylate copolymer, wherein (a) the ethylene-alkyl acrylate copolymer is present in the composition from about 0.1 to less than about 5 wt %, based on the total weight of the composition, (b) the ethylene-alkyl acrylate copolymer comprises about 50 to about 95 wt % polymerized units of ethylene and 5 to about 50 wt % polymerized units of one or more alkyl acrylates of the formula $CH_2=C(R^1)CO_2R^2$, based on the total weight of the copolymer, (c) $R^1$ is hydrogen or an alkyl group with 1 to 8 carbon atoms and $R^2$ is an alkyl group with 1 to 8 carbon atoms, and (d) the ethylene-alkyl acrylate copolymer is substantially free of comonomers having glycidyl groups.

2. The composition of claim 1, wherein the poly(hydroxyalkanoic acid) comprises polymerized units of 6-hydroxyhexanoic acid, 3-hydroxyhexanoic acid, 4-hydroxyhexanoic acid, 3-hydroxyheptanoic acid, or combinations of two or more thereof.

3. The composition of claim 1, wherein the poly(hydroxyalkanoic acid) comprises polymerized units derived from glycolic acid, lactic acid, 3-hydroxypropionic acid, 2-hydroxybutyric acid, 3-hydroxybutyric acid, 4-hydroxybutyric acid, 3-hydroxy-valeric acid, 4-hydroxyvaleric acid, 5-hydroxyvaleric acid, or combinations of two or more thereof.

4. The composition of claim 3, wherein the poly(hydroxyalkanoic acid) is poly(glycolic acid), poly(lactic acid), poly (hydroxy-butyric acid), poly(hydroxybutyrate-hydroxyvalerate) copolymer, copolymer of glycolic acid and lactic acid, or combinations of two or more thereof.

5. The composition of claim 4, wherein the poly(hydroxyalkanoic acid) is poly(lactic acid).

6. The composition in claim 5, wherein the poly(lactic acid) is a stereo complex of poly(D-lactic acid) and poly(L-lactic acid).

7. The composition of claim 1, wherein the ethylene-alkyl acrylate copolymer is selected from the group consisting of ethylene-methyl (meth)acrylate copolymers, ethylene-ethyl (meth)acrylate copolymers, ethylene-butyl (meth)acrylate copolymers, and combinations of two or more thereof.

8. The composition of claim 7, wherein the ethylene-alkyl acrylate copolymer is an ethylene-butyl acrylate copolymer.

9. The composition of claim 1, wherein the ethylene-alkyl acrylate is present at about 1 to about 4 wt %, based on the total weight of the composition.

10. The composition of claim 9, wherein the ethylene-alkyl acrylate is present at about 2 to about 3 wt %, based on the total weight of the composition.

11. The composition of claim 1, wherein the ethylene-alkyl acrylate copolymer comprises about 15 to about 40 wt % polymerized units of $CH_2=C(R^1)CO_2R^2$, based on the total weight of the composition.

12. The composition of claim 11, wherein the ethylene-alkyl acrylate copolymer comprises about 20 to about 30 wt % polymerized units of $CH_2=C(R^1)CO_2R^2$, based on the total weight of the composition.

13. An article comprising or produced from a composition wherein the article is a molded article, an extruded article, a thermoformed article, an oriented article or a combination of two or more thereof and the composition comprises, or is produced from, a poly(hydroxyalkanoic acid) and an ethylene-alkyl acrylate copolymer, wherein (a) the ethylene-alkyl acrylate copolymer is present in the composition from about 0.1 to less than about 5 wt %, based on the total weight of the composition, (b) the ethylene-alkyl acrylate copolymer comprises about 50 to about 95 wt % polymerized units of ethylene and 5 to about 50 wt % polymerized units of one or more alkyl acrylates of the formula $CH_2=C(R^1)CO_2R^2$ based on the total weight of the copolymer, (c) $R^1$ is hydrogen or an alkyl group with 1 to 8 carbon atoms and $R^2$ is an alkyl group with 1 to 8 carbon atoms, and (d) the ethylene-alkyl acrylate copolymer is substantially free of comonomers having glycidyl groups.

14. The article of claim 13, wherein
the poly(hydroxyalkanoic acid) is poly(glycolic acid), poly (lactic acid), poly(hydroxy-butyric acid), poly(hydroxybutyrate-hydroxyvalerate) copolymer, copolymer of glycolic acid and lactic acid, or combinations of two or more thereof; and
the ethylene-alkyl acrylate copolymer is selected from the group consisting of ethylene-methyl (meth)acrylate copolymers, ethylene-ethyl (meth)acrylate copolymers, ethylene-butyl (meth)acrylate copolymers, and combinations of two or more thereof.

15. The article of claim 14, wherein
the poly(hydroxyalkanoic acid) is poly(lactic acid) or a stereo complex of poly(D-lactic acid) and poly(L-lactic acid);
the ethylene-alkyl acrylate copolymer is an ethylene-butyl acrylate copolymer; and
the ethylene-alkyl acrylate is present at about 1 to about 4 wt %, based on the total weight of the composition.

16. The article of claim 15, wherein
the poly(hydroxyalkanoic acid) is poly(lactic acid); and
the ethylene-alkyl acrylate is present at about 2 to about 3 wt %.

17. The article of claim 13, wherein the article is a film or sheet.

18. The article of claim 15, wherein the poly(hydroxyalkanoic acid) is the stereo complex of poly(D-lactic acid) and poly(L-lactic acid); and the ethylene-alkyl acrylate is present at about 2 to about 3 wt %.

19. The article of claim 16, wherein the article is a film or sheet.

20. The article of claim 18, wherein the article is a film or sheet.

* * * * *